United States Patent [19]

Oonishi et al.

[11] 4,264,193
[45] Apr. 28, 1981

[54] IMAGE CONVERTING AND PROJECTING METHOD AND APPARATUS FOR CARRYING OUT THE SAME

[75] Inventors: Hajimu Oonishi, Hirakata; Masaru Ikedo, Neyagawa; Tadaoki Yamashita, Hirakata, all of Japan

[73] Assignee: Matsushita Electric Industrial Co. Ltd, Osaka, Japan

[21] Appl. No.: 31,142

[22] Filed: Apr. 18, 1979

[30] Foreign Application Priority Data

Apr. 20, 1978 [JP] Japan .................................. 53-47385

[51] Int. Cl.³ ...................... G03B 27/32; G03B 13/28
[52] U.S. Cl. ...................................... 355/32; 355/45; 355/77
[58] Field of Search ..................... 355/5, 32, 37, 45, 77

[56] References Cited

U.S. PATENT DOCUMENTS

| | | | |
|---|---|---|---|
| 3,591,375 | 7/1971 | Neale | 355/38 X |
| 3,663,101 | 5/1972 | Vor Grabe | 355/45 |
| 3,756,718 | 9/1973 | Letzer | 355/32 |
| 3,986,771 | 10/1976 | Tsukada | 355/5 X |

FOREIGN PATENT DOCUMENTS

| | | | |
|---|---|---|---|
| 919686 | 11/1954 | Fed. Rep. of Germany | 355/32 |
| 1132695 | 11/1968 | United Kingdom | 355/5 |

*Primary Examiner*—Fred L. Braun
*Attorney, Agent, or Firm*—Spencer & Kaye

[57] ABSTRACT

A method of converting a color negative image into an inverted positive color image and an apparatus for carrying out the method. The image of the color negative film is decomposed into three images each in one of the three primary colors through associated color filters. The individual images thus produced are recorded in a light transmissive recording medium in inverted images, which are then illuminated by a light source disposed at a side in opposition to the negative film, whereby the inverted images are projected through the same optical system including the aforementioned color filters as the one used for the projection onto a screen as the inverted positive image. The recording medium is constituted by a light transmissive ceramic dielectric exhibiting a memory function. The inverted positive image may be projected at a magnified scale.

8 Claims, 13 Drawing Figures

IMAGE CONVERTING AND PROJECTING METHOD AND APPARATUS FOR CARRYING OUT THE SAME

BACKGROUND OF THE INVENTION

1. Field of the Invention

The present invention relates in general to an image converting method and apparatus, and in particular concerns a method for converting an image such as a pattern of a color negative film for example into an inverted or positive image to be projected for observation or the like purpose. The invention also relates to an apparatus for carrying out the method.

2. Description of the Prior Art

In the hitherto known color image converting processes such as color inversion, a photographic process using agents of a silver salt series is generally adopted. Additionally, laser holography is used for effecting image conversion or inversion by varying the optical constants of a recording system and a reproducing system.

These prior known methods are however disadvantageous in that complicated and time consuming procedures are required for recording the original optical information (image data) in an intermediate recording medium and converting the recorded data into a final image.

SUMMARY OF THE INVENTION

Accordingly, an object of the invention is to provide a novel and improved image converting and projecting method and apparatus which are immune to the disadvantages of the prior known processes described above.

Another object of the invention is to provide an image converting and projecting method as well as apparatus for carrying out the same which are capable of producing a positive image from a negative image with a high resolution power and allow the reproducing process to be effected instantaneously without any discoloration or blurs in color by using an optical system including an electro-optical memory element.

Still another object of the invention is to provide an image converting and projecting method as well as an apparatus for carrying out the same which allows a color-converted image to be reproduced with an improved color reproducibility by using an optical system including an electro-optical memory element.

A further object of the invention is to provide an image converting and projecting method and apparatus which allows a converted image, e.g. a positive image of an original negative image to be simultaneously observed with the original image at a position different from that of the original image.

In view of above and other objects which will become apparent as the description proceeds, there is proposed according to a general aspect of the invention a method of converting an image of an original, comprising the steps of irradiating the original by means of a first light source to produce a projected image, separating the projected image of the original into three optical paths by means of a lens system, decomposing the projected image into three images each in one of the three primary colors by using three color filters, recording each of the projected and decomposed images in associated image recording means which includes a recording member exhibiting such electro-optical effect that the light transmissivity thereof varies in accordance with the lights and shades of the projected image of the original, wherein the three projected images decomposed in color are focussed onto the image recording means at different regions so that no overlap occurs among the focussed images which are then recorded as inverted images in the recording member, illuminating the image recording means by a second light source, and projecting the inverted images onto screen means through the color filters and the lens system.

The invention further proposes an apparatus for carrying out the method described above.

DETAILED DESCRIPTION OF THE PREFERRED EMBODIMENTS

Figure 1:
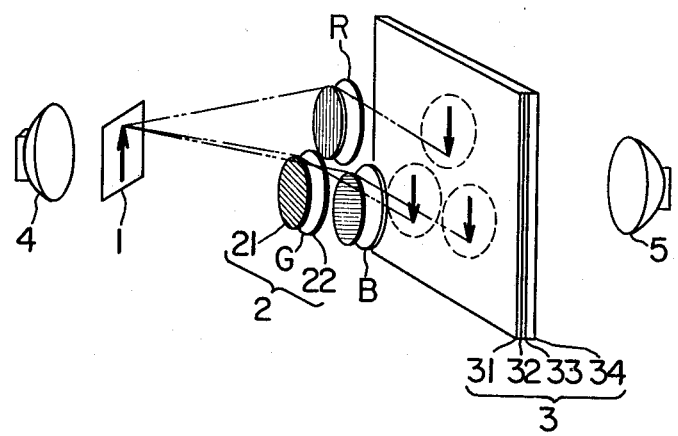
FIG. 1 shows schematically a general arrangement of an image converting and projecting system according to an embodiment of the invention.

Referring to FIG. 1 which shows schematically a fundamental arrangement for an image converting and projecting system according to the present invention, reference numeral 1 denotes an original, 2 denotes an optical system including a color filter array 22 composed of a red filter R, a green filter G and a blue filter B, 3 denotes a recording device composed of transparent electrodes 31 and 34, a photo-conductive layer 32 and a recording member 33, and numerals 4 and 5 designate light sources.

The original 1 or an equivalent two-dimensional light information carrier located at a projecting position is illuminated by the light source 4 and projected to the recording device 3 after having been split into three optical images. The recording device 3 has a recording layer constituted by the photo-conductive layer 32 and the electrostatic recording member 33 sandwiched between the transparent electrodes 31 and 34 across which a voltage is applied. The split and projected images are recorded on the electrostatic recording member 33. Subsequently, the recording device 3 is illuminated by the light source 5 at the side opposite that carrying the recorded image, whereby the converted image of the original is projected to the location 1 through the optical system 2.

The optical system 2 comprises three color filters 22 corresponding to the three primary colors combined with respective lens systems 21 which are arrayed so that the color images split through the optical system 2 are not superposed on one another at the recording device 3.

Figure 2A:
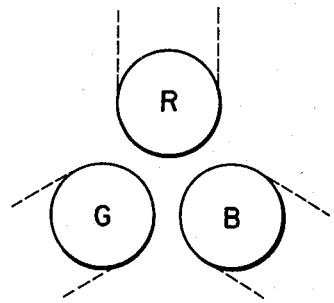
FIGS. 2A to 2C schematically illustrate different image focussing states of an optical system including filters.
Figure 2B:
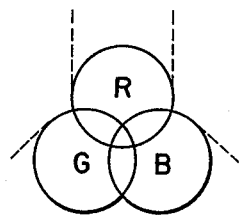
Figure 2C:
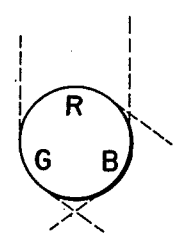

FIGS. 2A to 2C schematically illustrate image focussing states of the optical system including the color filters. In FIG. 2A, the split optical images projected through the respective color filters are focussed on the recording unit 3 without any overlap. In FIG. 2B, the projected images are overlapped partially, while in the state shown in FIG. 2C, all the focussed images are perfectly overlapped. With the present invention, it is intended to produce the focussed state shown in FIG. 2A in which the split color images have no overlaps, while the states in which the light images projected through the respective color filters are at least partially overlapped at the focussed plane of the recording device 3 are excluded from the applications intended by the invention, since such overlapped states will provide an obstacle to the reproducing process. In other words, in the case of the overlapped states shown in FIGS. 2B and 2C, a record is made such that the light component in color at the most contrasty portion of the original image becomes remarkably predominant, whereby satisfactory reconstruction of color can not be attained at the image reproduction.

Figure 3:
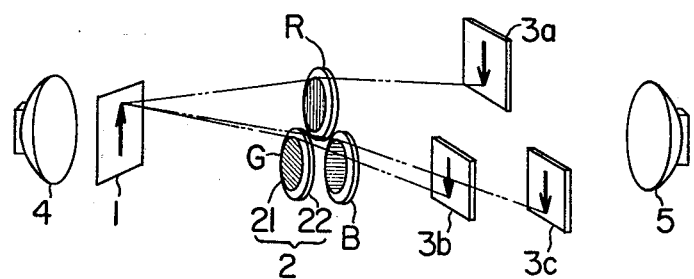
FIG. 3 shows schematically a general arrangement of the image converting and projecting system according to another embodiment of the invention.

FIG. 3 shows a fundamental arrangement of the image converting and projecting system according to another embodiment of the invention in which the recording means 3(a), 3(b) and 3(c) are separately provided in correspondence to the individual color filters. This arrangement is advantageous in that optical adjustment may be effected in a facilitated manner for recording and reproduction.

Figure 4:
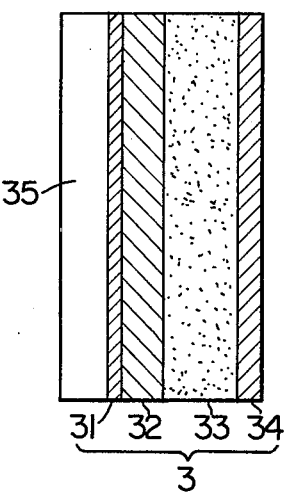
FIG. 4 shows in a sectional view a structure of a recording device according to an embodiment of the invention.

A structure of the recording means 3 is shown in FIG. 4, in which reference numerals 31 and 34 denote transparent electrodes, 32 denotes a photo-conductive layer such as a color-sensitized polyvinylcarbazole layer for example, 33 denotes a light transmissive recording member formed of transparent ceramics of the PZT-series for example, and 35 denotes a holding base plate having a high transparency. In the illustrated structure of the recording device, the photo-conductive layer 32 and the light transmissive recording member 33 constitutes a laminated recording layer sandwiched between the transparent electrode layers 31 and 34 across which a voltage is applied. Thus, a predetermined potential is applied to the laminated recording layer of the photo-conductive layer 32 and the light transmissive recording member 33 through the transparent electrodes 31 and 34.

When a projected image of the original is focussed on the recording layer, a pattern of shades, i.e. a pattern of bright and dark is recorded on the light transmissive recording member 33. The recorded image is to be reproduced in a color inverted image (e.g. positive image) after removal of the voltage. Accordingly, the light transmissive member should be constituted by the element which exhibits a memorization capability even after the removal of voltage for holding the recorded image. Otherwise, the recorded image will be made to disappear under illumination during the reproducing step because the photo-conductive layer is present. The electro-optical memory element as used should be made of a material exhibiting an excellent memorization capability which is thermally stable and less susceptible to light absorption in the visible spectral region after the removal of voltage. For example, transparent ceramics of the PZT-series exhibiting the memorization capability are preferred in carrying out the invention.

Now, the recording and reproducing process according to the principle of the invention will be described by referring again to FIG. 1.

When the original is illuminated with light radiation from the recording light source 4, a red component of light may pass through the red filter to be recorded on the recording layer. On the other hand, green and blue components are absorbed by the respective green and blue filters and can not reach the recording layer. The lights and shades of the original having a red component are recorded on the recording layer in the inverted pattern of the lights and shades. However, the recording layer does not respond to green and blue components, since the latter are absorbed by the respective filters.

Subsequently, when the recorded pattern is illuminated by the reproducing light source 5 and projected through the same optical system, green and blue components of source light may pass through the respective green and blue filters, while the red filter allow the inverted pattern of the lights and shades to pass therethrough, whereby these light components are combined at the position of the original thereby to reproduce the color inverted image of the original.

In order that the recorded pattern be reproduced with an improved color reproducibility by the image converting and projecting method according to the invention, it should be taken into consideration that the image of the original be inverted in color with substantially equal light intensity of the individual color components. In this connection, it will be noted that there arises no problem concerning the color reconstruction in the reproduced image so far as the photo-conductive layer has a uniform light sensitivity characteristic in the whole visible spectral region. However, if the light sensitivity of the photo-conductive layer varies in dependence on the wavelength of the light radiation, there will arise differences in bright and dark levels among the light and shade patterns passing through the respective filters, involving deteriorated color reproducibility. In this conjunction, since the photo-conductive layer having a uniform light sensitivity distribution over the visible spectral range is difficult to obtain in practice, the following adjustments are performed in combination with the use of a photo-conductive layer having non-uniform light sensitivity characteristics.

(1) Three photo-conductive layers each exhibiting substantially the same light sensitivity to each of three primary colors are individually provided.
(2) The magnitude of the voltage applied to the electro-optical memory elements is adjusted in dependence on the light sensitivity characteristics of the photo-conductive layers to the three primary colors.

(3) Neutral filters are used for the adjustment in dependence on the light sensitivity characteristics corresponding to the three primary colors.

(4) The light intensity of the reproducing light source is varied in correspondence to the light sensitivity characteristics of the photo-conductive layers associated with the three primary colors, respectively.

(5) When the recording device is of a light scattering property, a slit system is used in the optical system upon reproduction, thereby reducing the blur in color.

Figure 5:
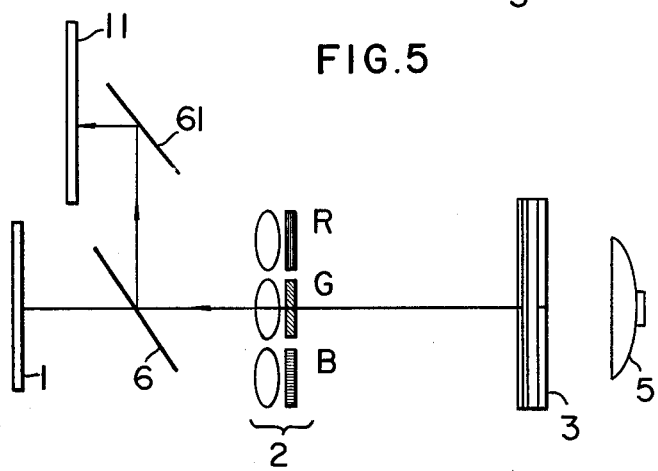
FIG. 5 shows schematically a general arrangement of a modified image converting and projecting system according to the invention.
Figure 6:
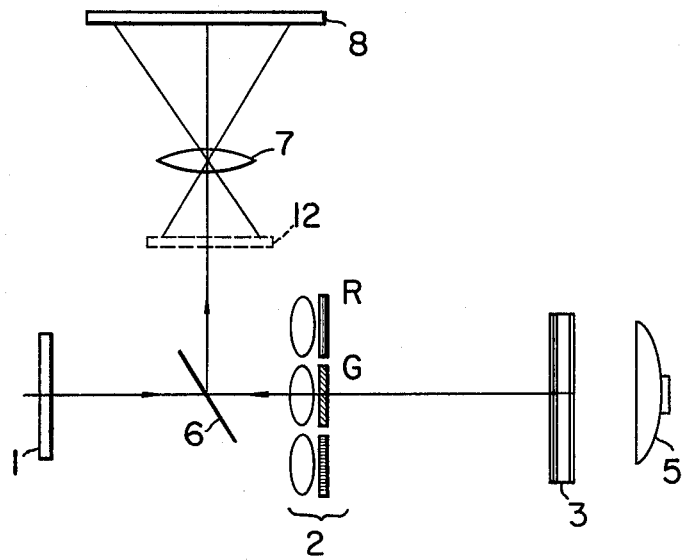
FIG. 6 shows schematically a general arrangement of the image converting and projecting system according to still another embodiment of the invention in which provision is made to magnify the projected image.

FIGS. 5 and 6 show schematically general arrangements of the image converting and projecting system according to other embodiments of the invention.

In the system shown in FIG. 5, a reflecting mirror or a half mirror is provided in the optical system to project the recorded image to a position other than that of the original. In the figure, reference numeral 1 denotes an original, 2 denote an optical system including lenses and color filters, 3 denotes a recording device, 5 denotes a light source, 6 denotes a reflecting mirror or a half mirror, 61 denotes a reflecting mirror, and 11 denotes a screen.

The system shown in FIG. 6 is implemented as a magnifying and projecting apparatus including a projecting lens in the optical system. In this figure, reference numeral 7 denotes a magnifying lens, 8 denotes a large size screen, and 12 denotes a real image. Although the reproduced image may be observed by providing a screen at the position of the original as is in the case of the systems shown in FIGS. 1 and 2, it is also possible to project the real image onto a separate screen through a reflecting optical system or to observe in a magnified scale on a white screen, as shown in FIGS. 5 and 6.

In the following, the invention will be described in conjunction with practical examples.

EXAMPLE 1

Figure 7:
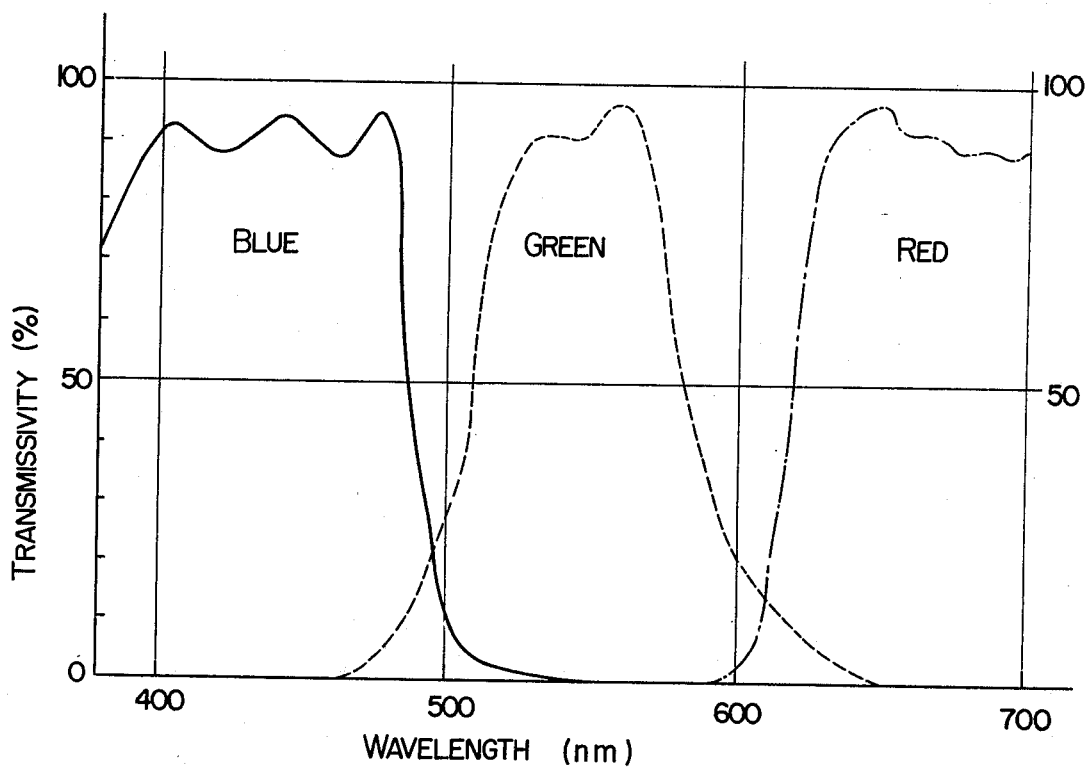
FIG. 7 illustrates graphically the wavelength separation characteristics of individual filters for red, green and blue colors employed in an embodiment of the invention.

Referring again to FIG. 1, the original 1 which may be a color film is irradiated by the illuminating light source 4, thereby to transmit the image of the original as three images produced by means of three lenses 21 to the focussing system. The red, green and blue filters 22 exhibiting separation characteristics illustrated in FIG. 7 are inserted in the optical paths to separate the color of the image into primary color components which are then projected onto the recording device 3. The recording device 3 is a multi-layer structure in which the photo-conductive layer 32 (which may be made of color sensitized polyvinyl-carbazole) and the recording member 33 of a transparent ceramics of the PZT series (NdLi/Zr/Ti: 8/65/35) of 200$\mu$ in thickness are sandwich between the transparent electrode layers 31 and 34 (indium oxide film deposited through evaporation).

In the operation of the recording device 3$a$, D.C. voltage of 300 V is applied between the electrodes 31 and 34 in the dark. Then, the light source 4 which may be a halogen lamp of 15 V and 150 W ratings is turned on for a short time thereby to project the image of the original 1 onto the photo-conductive layer 32. In accordance with the lights and shades of the projected image, the potential is distributed in a corresponding pattern in the photo-conductive layer 33, as a result of which a pattern of different transparency varying in accordance with the potential distribution pattern is produced in the recording member 33 with a high potential resulting in a correspondingly lowered light transmissivity of the PZT-series ceramics layer 33, whereby a pattern of the lights and shades reversed with respect to that of the original is produced and held as it is even after the removal of the voltage.

Figure 8:
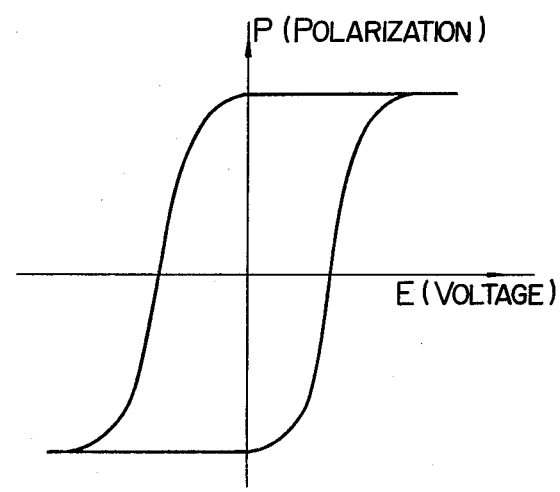
FIG. 8 illustrates graphically the polarization vis-a-vis electric field hysteresis characteristic of a recording member used according to the teaching of the invention.

FIG. 8 shows graphically a polarization (P) vis-a-vis electric field (E) hysteresis curve of a light transmissive dielectric ceramics. As can be seen from this hysteresis curve, polarization once produced by application of a voltage is retained even after the voltage is removed (i.e. memory function).

Figure 9:
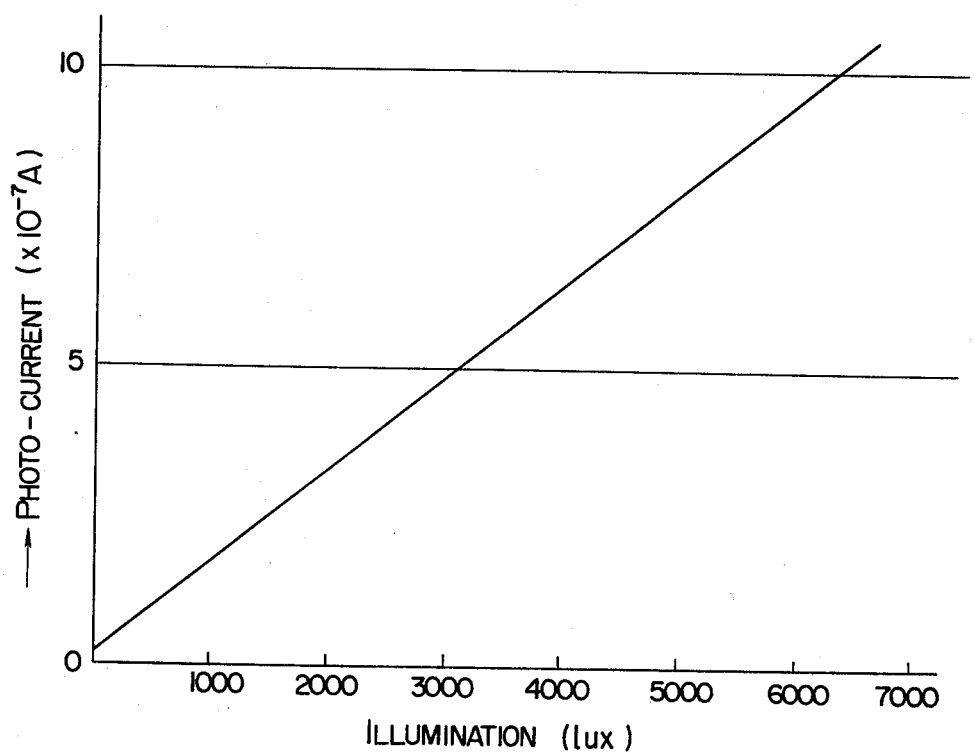
FIG. 9 illustrates graphically the illumination vis-a-vis photo-current characteristic of a light transmissive ceramic dielectric used as the recording member according to the teaching of the invention.

FIG. 9 shows graphically an illumination vis-a-vis photocurrent characteristic measured in the recording device of the structure shown in FIG. 4 and incorporating the transparent PZT-series ceramics described above under illumination by a tungsten lamp. It will be appreciated that a half-tone can also be reproduced.

It is preferred that the PZT-series dielectric ceramics among the light transmissive dielectric ceramics destined to be used as the recording layer member should be of a composition exhibiting the memory function such as represented by the hysteresis curve shown in FIG. 8 and a high transmissivity. For example, a material having an improved memorization capability and a high transmissivity can be obtained by adding to a solid solution of PZT-series element of I to III group as a substitute for Pb. It has been found that a composition having a Zr/Ti ratio of 65/35 with Nd-Li, La, La-Ba, La-Sr, Ba-Bi, La-Al and the like added thereto in a total ratio of 6 to 8 atomic % exhibits the desired characteristics.

Next, the original 1 as well as the light source 4 are displaced to another position, and the pattern recorded on the recording member 33 of a ceramic of the PZT-series is projected through the optical system in the direction opposite to that of recording, thereby forming an inverted image at the position of the original. In this manner, it has been found that an inverted clear image (positive image) of a negative color film can be obtained without any dislocation among color components or discoloration.

Erasure of the recorded image can be effected by heating instantaneously the light transmissive ceramics layer 33 at a temperature of 110° C. to 120° C. by Joule heat produced by the current flowing through the transparent electrode 34 (indium oxide deposited through evaporation and having a resistance of 50 $\Omega/cm^2$) between the opposite edges thereof. At this time, no voltage is applied between the electrodes 31 and 34.

Alternatively, the recorded image can be erased instantaneously by applying a voltage of inverted polarity across the light transmissive ceramic recording layer under simultaneous radiation heating by a high energy lamp.

EXAMPLE 2

Figure 10:
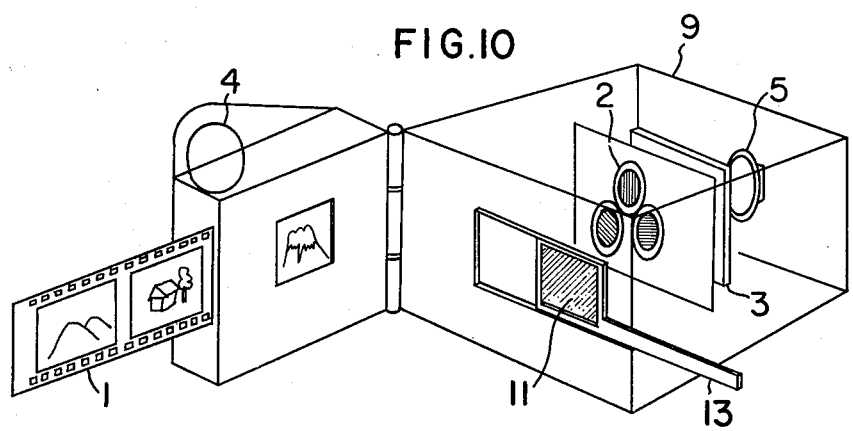
FIG. 10 shows schematically an example of a color negative image-to-positive image converting apparatus according to the invention.

FIG. 10 shows an exemplary embodiment of the inverted image projecting apparatus for a negative color film according to the teaching of the invention. In the figure, reference numeral 11 denotes a screen, 13 denotes a handle, and 9 denotes a black box. The handle member 13 serves to move the screen 11.

By reproducing the inverted image (positive image) of an image of a negative color film in the black box 9, a clear positive image can be produced.

EXAMPLE 3

Referring to FIG. 3, different photo-conductive layers each having a high sensitivity characteristic in the associated wavelength region are incorporated in the recording devices $3(a)$, $3(b)$ and $3(c)$.

When poly-N-vinylcarbazole bromide ($B_r$-PVK) sensitized in a red spectral region is employed as the photo-conductive layer for red color with poly-N-vinylcarbazole (PVK) being used for the photo-conductive layers for green and blue colors, a synthesized positive image of a good quality can be reconstructed from three images of the three primary colors.

In synthesizing the three primary colors, adjustment of color may be carried out by inserting a neutral filter in the projecting optical system which filter is selected so as to coincide with the sensitivity of the photo-conductive layer for the blue image which is the lowest among the three.

Further, color correction of the synthesized image can be accomplished by dividing each of the transparent electrodes of the recording device 3 into three parts and varying the voltages applied to the divided electrode parts in dependence on the associated primary color components.

Additionally, three projecting light sources 5 may be employed each in correspondence to each of the color filters. Then, the color correction or adjustment of the synthesized image can be effected by adjusting the light intensities of the individual light sources in accordance with the associated color components.

EXAMPLE 4

Figure 11:
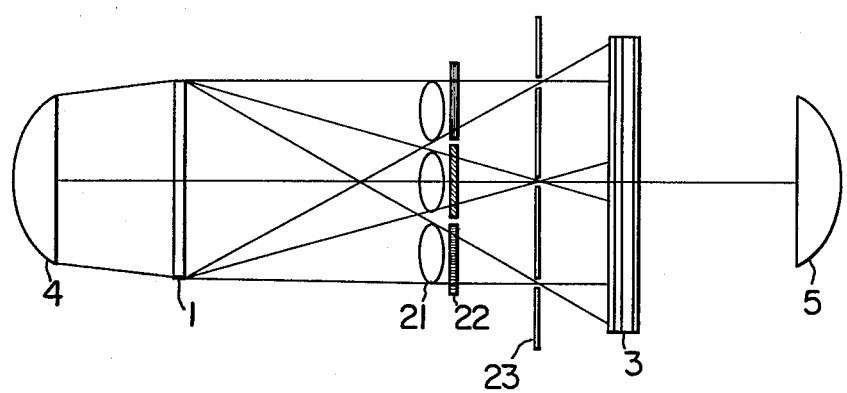
FIG. 11 shows schematically the image converting and projecting optical system according to still another embodiment of the invention in which a slit element is used for enhancing the color reproducibility of a reconstructed image.

FIG. 11 shows an image converting and projecting system according to another embodiment of the invention in which a slit member 23 is employed. By interposing the slit member 23 between the optical system 21, 22 and the recording device 3, the recording device is shielded from unwanted scattered light radiation, whereby a clear image having no discolorations can be reproduced.

The invention brings about the following advantages:

(1) No occurrence of dislocation of color components (blurs) or discoloration. In general, when images separated in three colors are to be synthesized or combined again, there will appear blurs or discolorations due to dislocation of the color components, since perfect matching among three images is difficult to attain because of positional deviation in the optical paths and differences in optical characteristics of the individual lenses and/or reflectors. In contrast, according to the invention, the recording optical system itself is used as the reproducing optical system for the projection in the opposite direction without any modification in the fundamental arrangement. Thus, neither blurs in color nor dislocation of the color component will be produced due to the characteristic difference of the individual lenses used in the optical system. Further, no exchangeability among three lenses is required, which leads to reduction in manufacturing costs.

(2) Processing for the recording and reproduction can be effected rapidly. With a recording system using a material of the silver salt series, it takes from one minute to about 30 minutes for developing and fixing procedures. According to the invention, the recording can be completed within a short time less than one second by application of voltage and the reproduced image can be instantly observed.

(3) Processing is very inexpensive. Since the electro-optical recording material (e.g. light transmissive ferrodielectric ceramics can be used for recording and erasing the image repeatedly, no material consumption is brought about by the image converting process. On the contrary, in the recording system using an agent of the silver salt series, it is impossible to use again the recording medium. In the case of laser holography, an expensive gas laser device is required which additionally involves high running cost.

(4) A high resolution power can be attained. Since the electro-optical memory material (e.g. light transmissive ceramics of the PZT-series) employed according to the teaching of the invention exhibits a resolution power on the order of 150 to 200 lines/mm, a high resolution can be attained in the reproduced image in combination with the feature that the recording optical system is used as the inverted image projecting system without any substantial modification.

(5) An improved color reproduction can be attained. Since the separated images of different primary colors are recorded at regions among which no image overlap takes place, adjustment or correction of colors can be easily attained for synthesizing the inverted color image.

We claim:

1. A method of converting an image of an original comprising the steps of irradiating said original by means of a first light source to produce a projected image, separating said projected image of said original into three optical paths by means of a lens system, decomposing the projected image into three images each in one of the three primary colors by using three color filters, recording each of said projected and decomposed images in associated image recording means which includes a recording member exhibiting an electro-optical effect such that the light transmissivity thereof varies in accordance with the lights and shades of said projected image of said original, wherein said three projected images decomposed in color are focussed onto said image recording means at different regions through slit means provided between said color filters and said image recording means so that no overlap occurs among the focussed images which are then recorded as inverted images in said recording member, illuminating said image recording means by a second light source, and projecting said inverted images onto screen means through said color filters and said lens system.

2. A method as set forth in claim 1, wherein said image recording means comprises a multi-layer structure of a photo-conductive layer and a light transmissive dielectric ceramic layer which are sandwiched between transparent electrodes.

3. A method as set forth in claim 2, wherein said light transmissive dielectric ceramic layer is formed of a ferrodielectric light transmissive ceramic composition of the PZT-series.

4. Apparatus for converting an image of an original comprising a first light source for irradiating said original with light radiation thereby producing a projected image thereof, a lens system for separating said projected image into three optical paths, three color filters for decomposing said projected image into three images each in one of the primary colors, image recording means including a recording member which exhibits such electro-optical effect that light transmissivity thereof undergoes changes in accordance with the lights and shades of said projected image and adapted to record therein a converted image of said projected image, slit means provided between said color filters and said image recording means, and a second light source for illuminating said image recording means, wherein the converted and projected image resulted from said illumination by said second light source is projected onto a screen through said color filters and said lens system.

5. An apparatus as set forth in claim 4, further including a reflecting mirror between said original and said lens system, wherein said converted and projected image is reflected by said mirror onto said screen.

6. An apparatus as set forth in claim 5, further including an optical system for magnifying said converted and projected image after having been reflected at said reflecting mirror.

7. An apparatus as set forth in claim 4, further including a half mirror disposed between said original and said lens system, wherein said converted and projected image is reflected by said half mirror onto said screen.

8. An apparatus as set forth in claim 7, further including an optical system for magnifying said converted and projected image after having been reflected at said half mirror.

* * * * *